United States Patent [19]

Sama

[11] 3,815,753

[45] June 11, 1974

[54] PURIFIER DEVICE

[76] Inventor: Nicholas Sama, 4940 S.W. 95th Ave., Miami, Fla. 33144

[22] Filed: June 18, 1972

[21] Appl. No.: 263,390

Related U.S. Application Data

[63] Continuation of Ser. No. 886,436, Dec. 19, 1969, abandoned.

[52] U.S. Cl................................ 210/284, 210/434
[51] Int. Cl............................................ B01d 25/02
[58] Field of Search............ 210/74, 169, 282, 284, 210/434

[56] References Cited
UNITED STATES PATENTS

| 2,072,848 | 3/1937 | Brown | 210/284 X |
|---|---|---|---|
| 2,137,397 | 11/1938 | Haldeman | 210/434 X |
| 3,233,737 | 2/1966 | Hultgren | 210/434 |
| 3,313,421 | 4/1967 | Falkenberg et al. | 210/169 X |
| 3,333,701 | 8/1967 | Scafuro | 210/169 |
| 3,362,537 | 11/1968 | Cline | 210/169 |
| 3,483,985 | 12/1969 | Axelrod | 210/169 |

Primary Examiner—John Adee
Assistant Examiner—Robert H. Spitzer

[57] ABSTRACT

A liquid purifier device for immersion in a body of liquid. It includes an annular canister with a through central column or main duct. The canister has inlet and outlet means in spaced relation so that there is a flow path through the canister interior or secondary duct, and in this flow path a purifying medium is located. When submerged, all of the inlet means are at a higher pressure level than the exit means whenever a flow of air is introduced into the lower end of the column so that a pressure differential is created, and a tube is provided to introduce a flow of air into the lower end of the column when it is submerged so that the differential of pressure thus created in the column acts as a lift tube pumping means to cause a flow through the purifying medium. The preferred purifying medium is activated charcoal, and the canisters may be adapted for stacking and use in combination with a filtering device.

14 Claims, 10 Drawing Figures

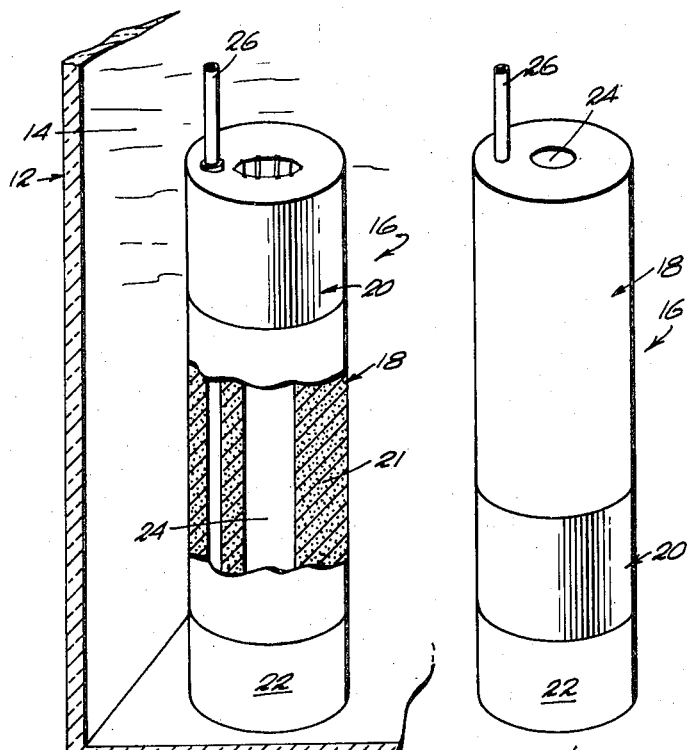
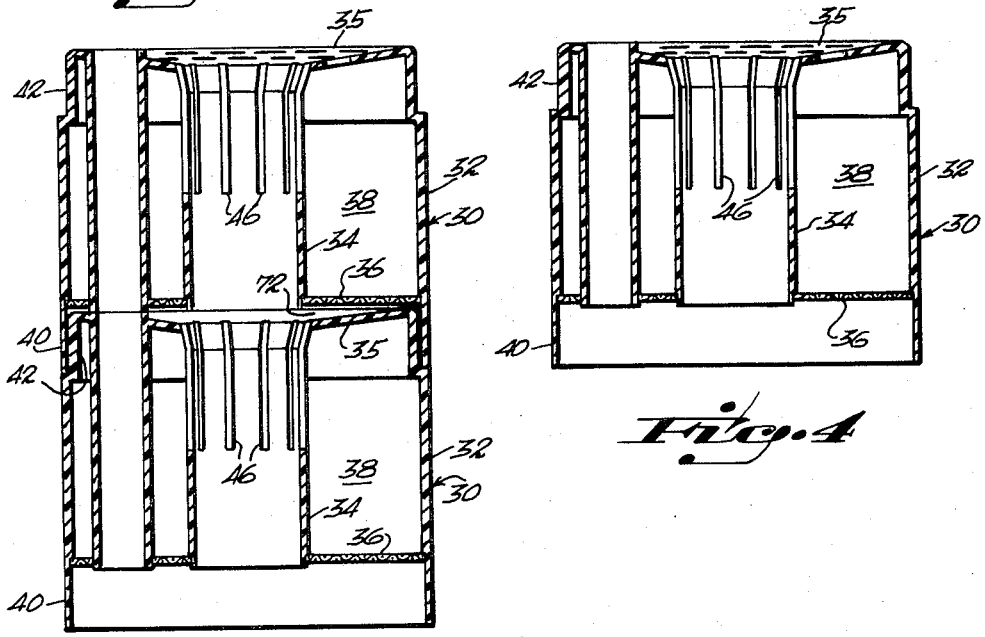

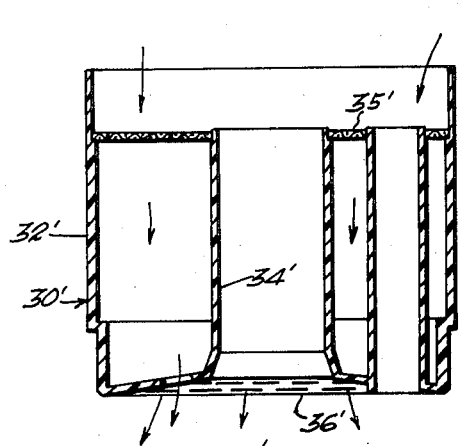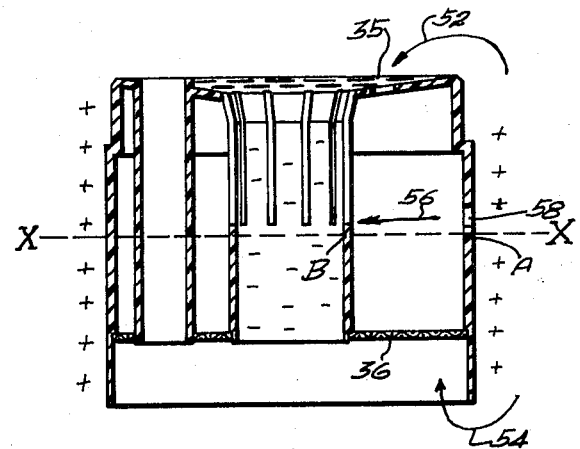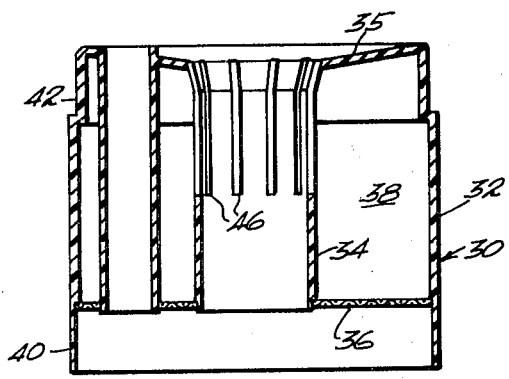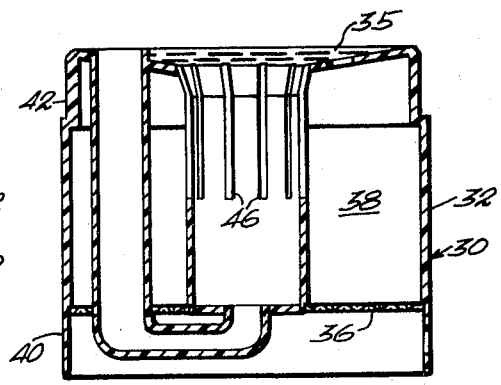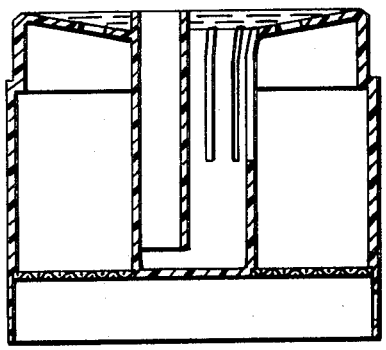

PURIFIER DEVICE

This application is a continuation of U.S. application Ser. No. 886,436 filed Dec. 19, 1969 now abandoned.

In the past there has been a need for a purifier especially for use in aquarium filters. The present invention provides such a device and includes a canister which is adapted for use either with or without a lift tube type filtering device, such as that disclosed in my copending patent application Ser. No. 240,491 now abandoned, and which may be adapted for stacking, in which the purifying medium may comprise a bed of granulated activated carbon.

It is, accordingly, a general object of this invention to provide an improved purifier device especially useful in aquariums which includes a canister with an inner chamber having inlet and exit means defining a flow through path and adapted to receive a charge of purifying medium in the path to purify water flowing therethrough and which includes an arrangement of the inlet and outlet means in relation to one another such that the inlet means are at a higher pressure level than the exit means.

It is a general object of this invention to provide an improved purifier device which is adapted to be used either alone or in combination with the filtering means and which may be embodied in several different types of structure for use in aquarium filters.

It is a general object of this invention to provide an improved purifier device which is inexpensive to manufacture, is adapted to be stacked together with other similarly constructed devices and used either along or in combination with a filtering device utilizing a lift tube principle.

In accordance with these and other objects which will become apparent hereinafter, the instant invention will now be described with reference to the accompanying drawings in which:

FIG. 1 is an elevation view which has been partly broken away and illustrating a liquid treating unit which includes the liquid purifier device in a submerged condition in a liquid tank;

FIG. 2 is a view similar to that of FIG. 1 and illustrating the purifier at the lower end of the water treating unit;

FIG. 3 is a perspective view of the purifying device;

FIG. 4 is a view in cross section of the purifying device and illustrating a stepped end portion to facilitate stacking and with inlet openings in the upper and lower ends of the canister and exit openings in the column wall;

FIG. 5 is a view of a plurality of stacked purifier devices;

FIG. 6 is an inverted view of a device somewhat modified with respect to that shown in FIG. 4 and illustrating the operation thereof by arrowed lines as described more fully hereinafter;

FIG. 7 is a view of a device similar to FIG. 4 and illustrating in combination with the text which follows the operation of the purifier device, the outer wall of the canister of this embodiment having inlet openings;

FIG. 8 is a view in cross section which is similar to FIG. 4 but with a closed upper end;

FIG. 9 is an alternative embodiment of the invention as described more fully hereinafter, having the lower column end closed with provision for introducing air thereinto; and FIG. 10 is an embodiment similar to that shown in FIG. 9 with a simplified structure to introduce air at the lower portion of the column or main duct.

Referring to the drawings wherein like reference characters designate like or corresponding parts throughout the several views, there is shown in FIG. 1, a tank 12 for holding a fluid 14 in which there is immersed a liquid-treating unit 16 which includes a filtering medium 18 and a purifying means 20.

In a preferred embodiment, the filtering means may be as described in my co-pending filter application, in which a tubular length of porous material 21 is provided in generally coaxial relation with a weight means 22. Means 26 are provided by which air is introduced at the lower portion of the column 24 to flow upwardly through the column and in so doing induce a flow of the liquid from the tank through the walls of the chimney, composed of the filtering material, and thence upwardly through the column. In the embodiment shown, the means 26 comprises a tube extending in coaxial relation longitudinally through the wall of the chimney.

Referring specifically to the purifier, which will be described in more detail later, it is seen that this purifier is arranged at the upper end of the filtering means 18 in the combination of FIG. 1. Alternatively, the purifying means may be provided at the lower end of the combination as shown in FIG. 2. In other words, the purifying device of the instant invention may be employed in combination with a filtering means either at the upper end or the lower end thereof. In addition it may be used separately as shown in FIG. 3.

The preferred structure for the purifier device will now be described with reference to FIG. 4. In that Figure it is seen that a canister 30 is provided which includes an outer wall 32, preferably of right circular cylindrical form and an inner wall or column wall 34 which is also preferably cylindrical, the column comprising a main duct. The canister includes end faces 35 and 36. It is thus seen that an inner chamber of annular cross section is provided intermediate the walls and faces, the chamber being designated by the numeral 38 and, as will be explained, comprises a secondary duct. With continuing reference to FIG. 4, one end of the outer wall extends axially beyond the end face 36 defining a skirt portion 40. Also, the other end of the outer wall is stepped as at 42, the said skirt and stepped portion comprising mating means as seen in FIG. 5 to facilitate stacking of the devices.

A suitable purifying medium is provided in the chamber 38 and in the preferred embodiment comprises granular activated carbon. Inlet means and exit means in spaced relation in the canister define a secondary flow path therebetween for the fluid in the tank, it being apparent from the drawings that the flowthrough path is arranged such as to constrain fluid being purified to flow between the inlet means and the exit means to come into intimate contact with the medium. As will be seen and described more fully hereinafter, all of the inlet means are at a higher pressure level than any of the exit means, when the canister is operating immersed in a fluid to be purified.

Referring now to the exit means of the embodiment shown in FIG. 4, it is seen that the same comprise a plurality of openings 46 which are preferably composed of axially extending slits opening at one end thereof at the end face 35 and extending toward the other end face 36 of the canister. The column wall 34 may have exit openings of a type other than those described, such as a pattern of openings of any suitable form such as small diameter holes. Locationwise, it will be seen that in the preferred embodiment these exit openings are arranged in the column wall 34. In any event, however, the criteria in use is that the openings of the exit means be arranged such that when the device is in operation, these openings are at lower pressure levels than that of the inlet means openings. For instance, in the embodiment shown in FIG. 6, to be described more fully hereinafter, it is seen that the exit openings are, geometrically speaking, below the openings of the inlet means; however, that from a fluid pressure point of view they are at a lower pressure level when the device is in operation, as indicated by the arrowed lines indicating the flow direction of that combination, of which a full description will be given hereinafter.

Referring to the inlet openings, it will be apparent that with the exception of the embodiment shown in FIG. 6, (that is, in the embodiment where the exit openings are not in the column wall 34,) it is not important whether or not the inlet openings are in the outer wall 32, or the end faces 35 or 36, or any combination of these. This is illustrated in the FIG. 7 in which it is seen that, as indicated by the plus signs the pressure is higher outside of the canister outer wall than it is at corresponding elevations within the column or main duct thereof. Thus, for any level, such as that indicated by the lateral line XX, the pressure will cause liquid to move from point A to point B along whatever path is available to it. Thus, it will flow, if there is an opening at B, 1) in the counterclockwise direction of arrow 52, if the openings are in the upper end face 35, 2) in the clockwise direction of the arrowed line 54 if the openings are in the end face 36, and 3) in the more direct route indicated by the arrowed line 56 if an opening is provided in the outer wall as at 58. In the preferred embodiment of FIG. 4, it will be seen that the openings are provided in both end faces.

It may be helpful at this point to consider the general over-all operation of the device when used in combination with a filter such as that described in my co-pending application. Referring to FIG. 1, as air is introduced through the tube 26, or by whatever means are employed, to flow to the lower end of the column 24, it will rise in the column and there will be, consequently, a mixture of the gas and liquid in the column or main duct which in relation to the more dense outside liluid medium, will cause a pressure differential at all levels resulting in a flow of liquid through the porous filtering medium of the chimney. Also, if a path is available, as provided by the canister structure described above in any one of the several embodiments, then the same type of flow will take place through the purifying medium.

Means are provided to captivate the granular carbon within the chamber 38 or secondary duct and may comprise a liner means or wafer of porous material over the inlet and exit openings. This means, which may be aptly termed screen means, in the preferred embodiment is achieved by holding the maximum dimension of the openings of the inlet means and the exit means to about one-third of the granule size.

Referring to FIG. 6, illustrating an alternative embodiment of the canister configuration, which is usable only as in FIG. 2, it is seen that the casing 30' also includes an outer wall 32' and an inner wall 34' as well as end faces 35' and 36'; however, the exit openings are not situated in the column wall 34 but, rather, in the end face 36' with the inlet openings being in the end face 35'. This is clearly illustrated by the arrowed lines of this Figure indicating the flowthrough path through the bed. Generally, because of the difference in the pressure between the column and the outer wall of the device at any level, the water will tend to flow into the column following the only path open to it, that is through the charcoal bed, the only entrances being in the end face 35' and the only exit being in the lower face.

Referring to FIG. 8, a preferred embodiment is also illustrated. This embodiment is similar to that of FIG. 4 in most respects and for this reason is not here redescribed. The only difference of this embodiment is that the uppermost end wall of this view or end face 35 is not provided with inlet openings. This is because this embodiment is for positioning at the top of the filter, for instance, as seen in FIG. 1 or as shown as the lower canister in FIG. 5. In this embodiment, referring to FIG. 2, if the canister is arranged at the bottom of the filtering means, it will be seen that in order for the water to have access to the inlet openings, it will be required to first pass through the filtering medium 18 insuring in such an arrangement, as in the others shown, that the water or liquid will necessarily pass through the filtering medium before passing through the purifying medium of the bed in the canister. In other words, in the preferred operation, the liquid is free of particulate matter on passing through the purifying medium, which prolongs the use of the purifying medium by minimizing intrusion of such particulate matter which would otherwise progressively reduce the intergranular spacing reducing the flow through the bed and ultimately effectively clogging these spaces. This is not an insignificant factor in view of the volume flow through the device, and the fact that it operates at very low pressure differences.

Referring to FIG. 5, the lower of the stacked devices there shown is of the type of the embodiment of FIG. 8, i.e., no openings of the inlet means in the end face 35. It will be noted, however, that the end face is recessed so that there is a space 72 circumposed about the column providing free communication between the liquid in the column and the inlet ports in the end face 36 of the uppermost canister. Or, indeed, if the entire FIG. 5 were viewed in an inverted position, would provide communication between the two canisters to the lower one, which would then be the uppermost one. It will be apparent that in the event that the holes are located in both end faces, the recessed end face providing and defining the space 72 is not required; however, this is at the sacrifice of the constraining of the flow through the filtering medium first as described above.

Referring now to FIG. 3, it will be seen that the purifier device is illustrated alone, that is without the filtering means 18. In this embodiment, the air is provided at the lower end of the column, the lower end being closed as indicated in FIG. 9. Any suitable means may be provided for introducing air at the lower end of the column, and in accordance with the same fluid mechanical principles described above, will produce the desired flow.

It will be seen that in all of these embodiments, there is provided a longitudinally extending passageway to admit or receive slidably the air inlet tube 26 shown in FIG. 1 so that a plurality of the water treating elements, either the filtering means 18 or the purifying canisters in stacked relation and common orientation may be assembled to define a generally cylindrical structure for treating liquid.

Among the advantages to be derived from the foregoing is the fact that the canisters may be replaced by withdrawing one and replacing it by one with fresh activated carbon in it.

What is claimed is:

1. An air-driven, liquid purifying device for use in a submerged position in a body of liquid, comprising:
   a. a main duct, of substantially cylindrical geometry and oriented substantially vertically when in operation, said main duct having a main inlet means and a main outlet means in spaced relation and defining a primary flow path through the device; said main inlet means being located at the lower end of said main duct, and said main outlet means being located at the upper end of said main duct;
   b. a chamber, enclosing the main duct and joined to the main duct outer wall such that the main inlet and main outlet means are outside the enclosure;
   c. a secondary duct, formed by the provision of secondary inlet means located on the wall of said chamber, and of secondary outlet means located on the main duct wall at points downstream of the main inlet means and in flowthrough communication with the main duct; said secondary inlet and outlet means defining thereby a secondary flow path through the device;
   d. a bed of purifying medium permeably disposed in said chamber; means associated with said chamber providing flowthrough fluid communication between the secondary inlet means and the surrounding liquid and
   e. means for introducing air into the main duct at said main inlet means, whereby a primary flow is operatively induced in the main duct inwardly and upwardly through the main inlet means and outwardly through the main outlet means, and a secondary flow is operatively induced in the secondary duct inwardly through the secondary inlet means, thence through the purifying bed in said chamber, and outwardly through the secondary outlet means to join the primary flow in the main duct, exiting thereby from the device through the main outlet means together and mixed with the primary flow.

2. The device as set forth in claim 1 wherein said device comprises an annular canister having end faces and an inner and outer wall, the said canister defines said chamber, said chamber being circumposed about and defining said main duct.

3. The device as set forth in claim 2 wherein the secondary inlet means comprise a pattern of openings generally facing in an axial direction.

4. The device as set forth in claim 3 wherein the pattern is in one end-face only.

5. The device as set forth in claim 2 wherein the openings are in both end-faces of the canister.

6. The device as set forth in claim 2 wherein the secondary outlet means comprises a plurality of openings in the inner wall of the canister.

7. The device as set forth in claim 6 wherein the plurality of openings in the inner wall comprises axially extending slits.

8. The device as set forth in claim 7 wherein the axially extending slits terminate at one end of the inner wall.

9. The device as set forth in claim 2 wherein the structure of said canister one of said ends includes mating means and companion mating means at the other end for intermating a plurality of said canisters in stacked relation.

10. The device as set forth in claim 2 wherein screen means are provided to captivate the medium in the chamber.

11. At least two of the devices as set forth in claim 9 stacked in mating relation wherein the secondary inlet means are comprised of a plurality of openings in the lower axially facing end of the uppermost canister and the upper end of the next lower canister is recessed intermediate the outer wall of the canister and the inner column wall of the canister defining an annular space about the column between the adjacent canister end when intermated whereby water is adapted to communicate from the column of the canister through the annular space and through the axially facing openings comprising the inlet means of the upper canister.

12. The device as set forth in claim 2 wherein the secondary outlet means comprise openings in the inner wall and the secondary inlet means comprises openings in the outer wall.

13. The device as set forth in claim 2 wherein means are provided for introducing a flow of air into the lower inlet means of the main duct comprising a tube extending axially through the canister.

14. The device as set forth in claim 13 wherein the tube extends in a longitudinally extending direction within the column of the canister to the lower portion of the column.

* * * * *